United States Patent [19]

Hoffman et al.

[11] 3,755,031

[45] Aug. 28, 1973

[54] PANEL AND METHOD OF MAKING IT

[75] Inventors: Frank A. Hoffman; Melvin L. Buchanan; Carl J. Dunbar, all of Columbus, Ind.

[73] Assignee: Arvin Industries, Inc., Columbus, Ind.

[22] Filed: Oct. 13, 1971

[21] Appl. No.: 188,799

[52] U.S. Cl.............. 156/79, 156/219, 156/226, 156/227, 156/245, 156/285, 156/299, 161/37, 161/88, 161/95, 161/99, 161/123, 161/160, 264/45, 264/90, 264/135, 264/250, 264/257, 264/260

[51] Int. Cl............... B29c 19/00, B32b 5/18

[58] Field of Search .................. 161/36–41, 44, 99, 100, 102, 104, 108, 118, 121, 123, 88, 151, 159, 160, 95, 96; 156/78, 79, 219, 220, 226, 227, 245, 268, 285, 299; 264/45, 135, 88, 90, 92, 250, 251, 253, 257, 260, 331; 52/309

[56] References Cited

UNITED STATES PATENTS 3,649,398 3/1972 Keith ..................................... 156/79
3,654,053 4/1972 Toedter ............................. 161/44 X

*Primary Examiner*—William A. Powell
*Attorney*—Verne A. Trask et al.

[57] ABSTRACT

A panel construction and method of making it employing a flexible skin having a rigid block bonded thereto. A groove extends across said block with its apex terminating at said skin whereby said skin is foldable along the axis of said apex for forming the panel construction into the desired configuration.

8 Claims, 6 Drawing Figures the laminate 15. After the resin has cured, the core 25 is removed, the vacuum released on the cavity 17 and the finished panel 10–12 is removed from the cavity 17.

As shown in FIG. 1, the projections 26 form a pair of parallel longitudinally spaced parallel channels 38 in the finished panel. Said channels extend across the entire lateral extent of the panel to thus separate the center panel section 10 from the end sections 11 and 12. Each of the channels has a pair of side faces 39 and 40 which, in the embodiment illustrated, have an included angle of 90°. As shown in FIG. 1, the laminate 15 has V-shaped notches cut therein which are disposed in alignment with the ends of the channels 38. For ease of manufacture, the notches are formed in the laminate 15 prior to its placement on the die 16.

In order to assemble the panel 10–12 into the configuration illustrated in FIG. 2, it is merely necessary to apply an adhesive 42 to the side faces 39 and/or 40 of channels 38, and then fold the end sections 11 and 12 inwardly into the position shown in FIG. 2. This disposes the faces 39 and 40 in abutting engagement with each other for bonding the end sections 11 and 12 in planes perpendicular to the center section 10. During such folding, the laminate 15 at the apexes of the channels 38 serves as a pair of hinges to permit such folding. While the projections 26, and thus the channels 38 formed thereby have included angles of 90°, it is to be understood that said projections and channels may have any desired included angles depending upon the angles desired between the different panel sections.

During the formation of the panel, the cloth lamina 19 provides an interconnecting link between the resin 22 and the plastic lamina 18. The resin 22 is able to be interlocked into the textured woven surface of the cloth lamina 19 and form a rigid bond therewith. Should the cloth lamina 19 be omitted, any suitable adhesive may be placed upon the inwardly presented face of the plastic lamina 18 to provide an integral bond between said lamina and the resin 22. If such an adhesive is applied, it must, of course be applied to the lamina 18 prior to the injection of the resin 22 into the distended lamina.

The resin 22 may be either thermoplastic or thermosetting. For example, we have employed a polyurethane resin which is injected into the distended laminate 15 in a fluid state at ambient temperature. It can then be heated to cure into a rigid block which is bonded to the laminate 15. We have also employed thermoplastic resins such as polystyrene which is injected into the distended laminate in a heated fluid state and then allowed to cool into a cured rigid state.

It may also be desirable to incorporate a blowing agent into the resin 22. Such blowing agents are activated during the curing of the resin to cause said resin to cure into a foamed rigid cellular block. The incorporation of such blowing agents provides the advantage of giving the resin, and thus the panel, a lower bulk density. In addition, the cellular structure provided by the incorporation of such blowing agents increases both the thermal and acoustical insulating properties of the panel. An example of such a blowing agent which we have employed is diphenylmethane diisocyanate (MDI).

The addition of such blowing agents may also provide the necessary heat for curing a thermosetting resin. For example, when MDI is incorporated with uncured polyurethane, the mixture will produce an exothermic reaction to cure the polyurethane.

The amount of blowing agent incorporated into the resin 22 will depend upon the type of agent employed and the bulk density desired in the cured resin. For example, a polyurethane resin containing 50 percent of MDI as a blowing agent will, upon curing, have a bulk density of eleven pounds per cubic foot.

As indicated previously, it may be desirable to eliminate the cloth lamina 19, and in lieu thereof, in order to securely bond the resin to the skin 18 the resin contacting face of the skin 18 is coated with an adhesive. The particular type of adhesive will, of course, depend upon the type of resin and skin employed in the panel. When the resin is a thermosetting resin, it is of course necessary that the adhesive cure upon being heated to bond said resin to the skin. Examples of such adhesives are Armstrong Cork Company's Expoxy A-34 and Three M Company's EC 2214. Where, however, the resin is thermoplastic the adhesive must cure upon cooling. Examples of such adhesives are Three M Company's EC 2262, Armstrong Cork Company's N-111 and Pittsburgh Plate Glass Company's 590.

The laminate 15 must, of course, be flexible in order to permit the panel sections to be folded with respect to each other during assembly of the panel. We have employed both thermoplastic and thermosetting materials as the skin 18 although we have generally employed polyvinyl chloride as a skin forming material because of its excellent physical properties and relatively low cost. Examples of other such skin forming materials which we have employed are urethane and acrylic films.

The following are representative examples of the methods and materials which we have employed in making panels according to the invention.

EXAMPLE 1

A polyvinyl chloride skin having a thickness of 8–20 mils was laminated to a cloth backing of cotton. The laminate, after two pairs of notches were cut in its opposed edges, was placed on a die and drawn into the die cavity with the cloth backing presented upwardly. With the laminate distended into the die, a 50-50 mixture of polyurethane resin and MDI was injected into distended laminate and a core was placed on the die to project into the resin. Said core had a pair of V-shaped projections extending thereacross in alignment with the notches in the laminate. The resin was then allowed to cure by the exothermic curing action of the mixture for 12 minutes into a rigid state bonded to the cloth backing. As the mixture cured it released carbon dioxide to cause the resin to cure into a rigid cellular structure. After the resin was cured, the core was removed, and the finished panel was removed from the die.

EXAMPLE 2

A polyvinyl chloride skin having a thickness of 8–20 mils was coated on one of its faces with a contact adhesive and two pairs of opposed notches were cut in its opposed edges. It was then drawn into a die cavity with its coated face presented upwardly and polyurethane was injected into the distended cavity. A core was placed on the die into the polyurethane, said core having a pair of V-shaped projections engaging the adhesive coated face of the skin in alignment with the notches formed therein.

PANEL AND METHOD OF MAKING IT

BACKGROUND OF THE INVENTION

In the manufacture of various types of structures such as cabinets, housings and the like, it is common practice to employ a sheet-metal panel having plastic skin laminated thereto. The panel provides the structural rigidity for the structure and the plastic skin provides the decorative appearance. In forming such structures from this type of a laminate, the laminate is bent into the desired configuration so that the finished three-dimensional article is shipped in preformed assembled condition.

This type of manufacture has certain inherent disadvantages. The sheet-metal panel, while providing structural rigidity, provides very little thermal or acoustical insulating properties to the finished article. Further, since the laminate is formed into the desired shape at the point of manufacture, the finished article will occupy a substantial volume of space during shipment.

It is an object of this invention to overcome these difficulties and disadvantages by providing a panel construction and method of making it in which said panel construction can be shipped in a compact knocked-down condition, but which can be easily and quickly assembled; which will be of lightweight construction, yet prove durable and sturdy in use; and which will have improved thermal and acoustical insulation properties.

SUMMARY OF THE INVENTION

In accordance with one form of the invention, as it is employed in the manufacture of a knocked-down panel adapted to be assembled to provide a first panel section having a pair of end sections perpendicular thereto, a laminate consisting of a flexible plastic skin having a cloth backing laminated thereto is placed over the cavity of a die. It is drawn into the cavity with the skin conforming to the walls thereof and the cloth backing disposed in an inwardly presented orientation. An uncured fluid resin is injected into the distended laminate and a core is then placed over the cavity to project into the resin. The resin is then cured into a rigid structure, and during such curing, is bonded to the cloth lamina.

The core is provided with two transversely extending parallel V-shaped projections, the apexes of which abut the cloth lamina so that there is little, if any, of the resin interposed between the cloth lamina and the apexes of said projections. Thus, the projections form two V-shaped channels in the cured resin extending across the panel.

After the resin has cured, the core is removed and the completed panel is removed from the die cavity. In assembling the finished panel, any suitable adhesive can be applied to the faces of the channels in the cured resin, and the two end panel sections, which are disposed outwardly from said channels, are folded toward each other so that the adhesive coated channel faces are in abutting engagement with each other to rigidly bond the panel end sections in parallelism with each other. During the movement of the panel end sections toward their folded positions, the skin-cloth laminate serves as a flexible member or hinge to permit such folding.

BRIEF DESCRIPTION OF THE DRAWINGS

The accompanying drawings illustrate the invention. In such drawings.

DETAILED DESCRIPTION OF THE PREFERRED EMBODIMENT

Figure 1:
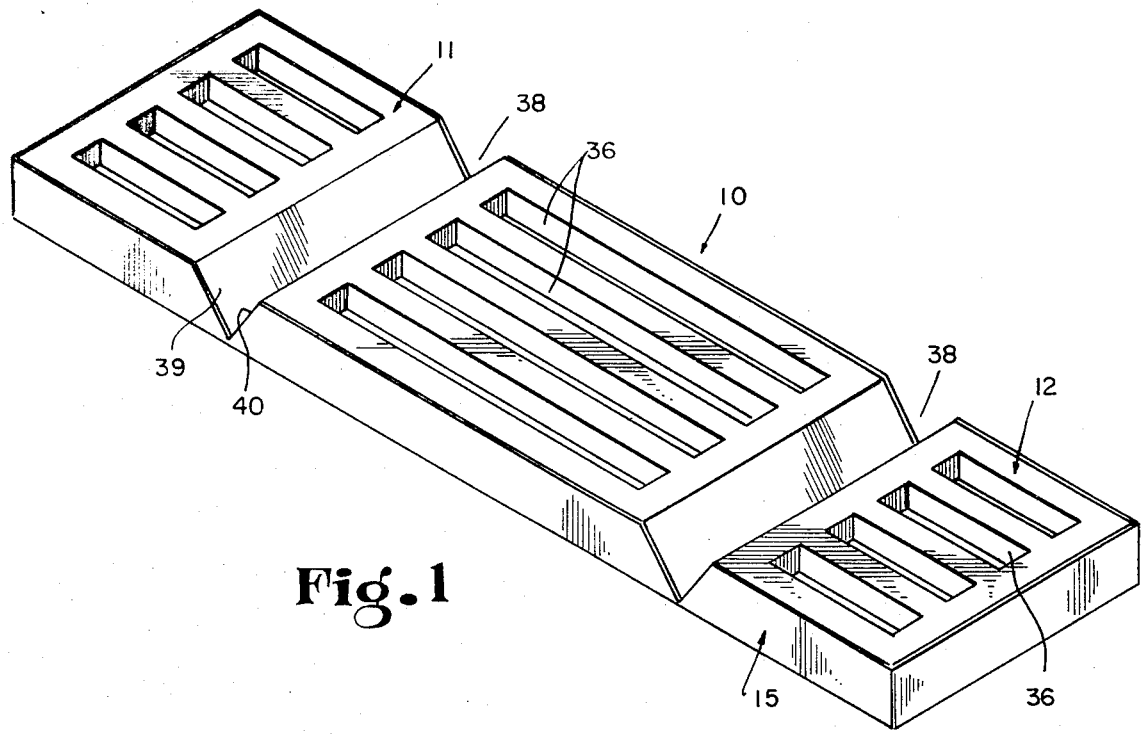
FIG. 1 is a perspective view of a panel made according to the invention.
Figure 2:
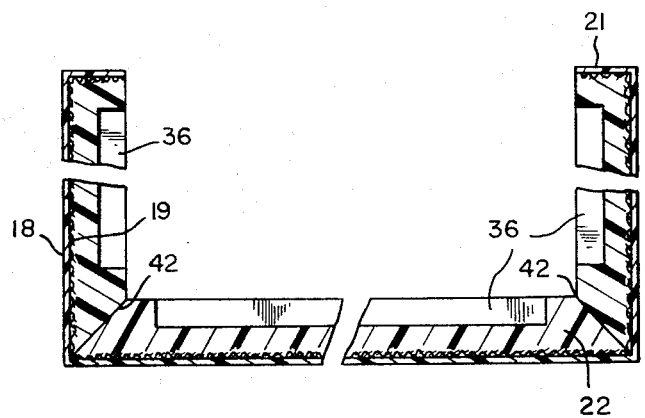
FIG. 2 is a fragmentary section of the panel shown in FIG. 1, but showing said panel in a folded orientation.
Figure 3:
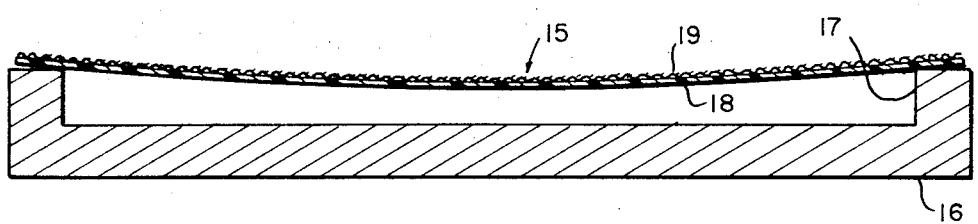
FIGS. 3–5 are transverse sections of a die assembly showing the subsequential steps for carrying out the invention.

This invention is concerned with the production of a panel construction which can be produced and shipped in a planar knocked-down condition, but which can be easily and quickly assembled into the desired shape. Thus, in the configuration illustrated in FIGS. 1 and 2, the center panel section 10 and the end panel sections 11 and 12 are coplanar in their knocked-down form but can be easily assembled into the configuration illustrated in FIG. 2 wherein the end sections 11 and 12 are perpendicular to the plane of the center section 10.

In producing the panel 10–12, a flexible laminate 15 is placed over a die 16 having a cavity 17. The laminate, which constitutes the outer panel skin or decorative surface, comprises a flexible plastic sheet 18 laminated to a cloth backing 19. The sheet 15 is placed on the die 16 such that the plastic lamina 18 will be disposed in contact with the walls of the cavity 17 and the cloth backing lamina will be presented inwardly. A vacuum is drawn on the cavity 17 to distend the laminate 15 into the cavity with plastic lamina 18 abutting the walls thereof so that the laminate is deformed into a cup or tray shaped configuration having a bottom wall 20 to interconnect to a plurality of side walls 21.

Figure 4:
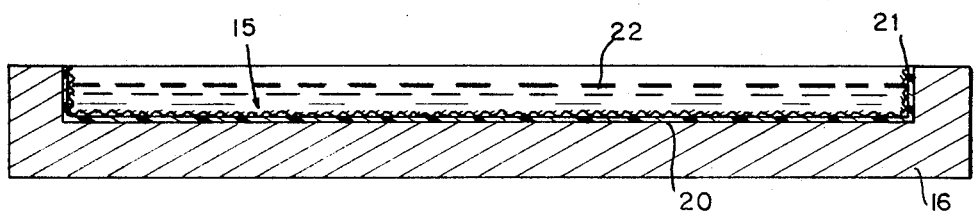
Figure 5:
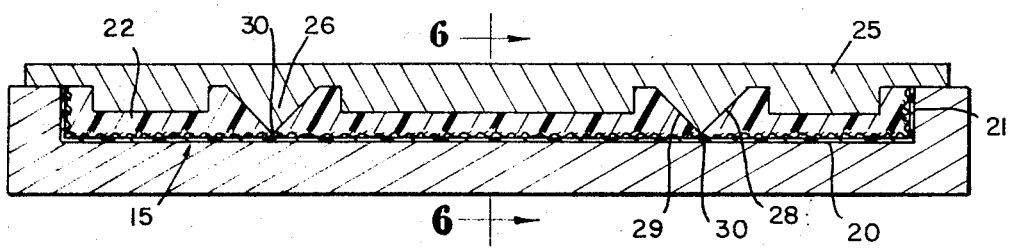
Figure 6:
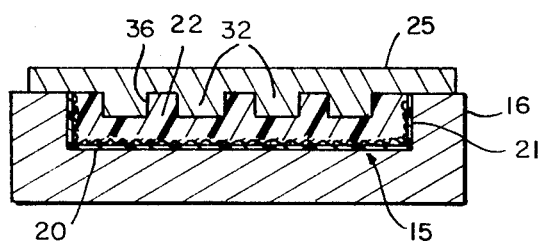
FIG. 6 is a vertical section taken on the line 6—6 of FIG. 5.

As shown in FIGS. 4 and 5, after the laminate 15 has been distended into the die cavity 17, an uncured fluid resin 22 is injected into the distended laminate. After the resin 22 has been injected, a core 25 is placed on the die 16 to project into the resin. In order to form the sectioned panel 10–12 illustrated in FIG. 1, the core 25 is provided with a pair of parallel V-shaped projections 26 each of which has a pair of side walls 28 and 29 whose included angle is 90°. The projections 26 have a depth such that when the core 25 is placed on the die 16, the apexes 30 of the projections 26 abut the cloth lamina 19 at the bottom wall 20 of the laminate thereby preventing little, if any, of the resin 22 from being interposed between the apexes 30 and the cloth lamina 19. Desirably, in order to reduce the weight of the panel, a plurality of parallel ribs 32 also project downwardly from the lower face of the core 25 in spaced relation to the bottom sheet wall 20 to form recesses 36 in the panel 10–12. As shown the ribs 32 are set inwardly from the sides and ends of the core as well as from the projections 26. In this manner, the recesses 36 will be formed inwardly from these areas to permit the resin to define rigid borders along the periphery of the panel sections.

The core 25 remains in position on the die 16 while the resin 22 is allowed to cure into a rigid block. During such curing, the resin is bonded to cloth lamina 19 to thus form an integral bond between the resin block and This assembly was heated to 225° F. for 3 minutes to cure the polyurethane into a rigid state and bond it to the skin. After curing, the core was removed from the panel, and the finished panel was removed from the die.

In each of these examples, the core projections formed V-shaped channels in the resin dividing the panel into a center section and a pair of end sections, said sections being interconnected by the outer flexible skin or sheet. And as previously described, after the panels were formed, an adhesive was applied to the faces of the panel channels and the panel end sections were folded inwardly bringing the adhesive coated channel faces together for bonding the end sections at the desired angles with respect to the center section. While the invention has thus been described and illustrated as forming a panel having three interconnected sections, it is to be understood, of course, that it can have any desired number of sections depending upon the number of channels molded therein. Thus, the panel may be formed with six interconnected sections for forming an enclosed rectangular structure, or five such sections for forming a five sided structure, etc. Further, the channels can be formed with any desired included angle depending upon the angular relationship desired between adjacent panel sections.

We claim:

1. A method of making a panel construction, comprising the steps of placing a flexible plastic skin over a die having a cavity formed therein, distending said skin into said cavity, injecting a fluid resinous material into said cavity into the distended skin, placing a core on said die to extend into said resinous material, said core having at least one projection extending across the distended skin and disposed in contact witherewith, curing said resinous material to form it into a rigid block bonded to said skin, and removing said core from the block and the finished panel construction from the cavity.

2. The method as set forth in claim 1 in which said projection has a V-shaped cross-section.

3. The method as set forth in claim 1 in which said projection has a V-shaped cross-section, and said skin prior to the step of distending it into said cavity has a pair of V-shaped notches formed in its opposed edges in alignment with said projection.

4. The method as set forth in claim 1 in which said flexible plastic skin comprises a plastic lamina having a cloth lamina bonded thereto, and said skin is oriented on said die with the plastic lamina engaging the walls of the die cavity.

5. The method as set forth in claim 1 in which said flexible plastic skin has an adhesive applied to its resin engaging face prior to the step of injecting said resinous material into the distended skin.

6. The method as set forth in claim 1 in which said resinous material contains a blowing agent adapted to be activated during said curing step to cause said resinous material to cure into a rigid cellular block.

7. The method as set forth in claim 1 with the addition that said core has a plurality of ribs projecting into said resinous material and disposed out of contact with said skin.

8. A method of making a panel construction comprising the steps of forming a pair of V-shaped notches in the opposed edges of a flexible skin, placing said skin on a die having a cavity formed therein, distending said skin into said cavity, injecting a fluid resinous material containing a blowing agent into said cavity into the distended skin, placing a core on said die, said core having at least one V-shaped projection extending across the distended skin in alignment with the notches in said skin and projecting through said resinous material to contact said skin, said skin having a plurality of ribs projecting into said resinous material and disposed out of contact with said skin, curing said resinous material while activating said blowing agent to form said resinous material into a rigid cellular block, and removing said core from the block and the finished panel construction from the cavity.

* * * * *